(12) United States Patent
Liu et al.

(10) Patent No.: US 6,329,766 B1
(45) Date of Patent: Dec. 11, 2001

(54) DIGITAL ILLUMINATION ADJUSTING CIRCUIT

(76) Inventors: Daniel Liu; Dragon Chang, both of 4F, No.10, Alley 59, La. 42, Min Chuan Road, Hsin Tien, Taipei Hsien (TW)

( * ) Notice: Subject to any disclaimer, the term of this patent is extended or adjusted under 35 U.S.C. 154(b) by 0 days.

(21) Appl. No.: 09/721,815

(22) Filed: Nov. 22, 2000

(51) Int. Cl.$^7$ ................................................ H05B 37/02
(52) U.S. Cl. ......................... 315/295; 315/315; 315/316
(58) Field of Search ................................. 315/313, 295, 315/314, 315, 316

(56) References Cited

U.S. PATENT DOCUMENTS 5,530,322 * 6/1996 Ference et al. ...................... 315/295

\* cited by examiner

Primary Examiner—David Vu

(57) ABSTRACT

A digital illumination adjusting circuit used to adjust the output to a power level of an alternating load via a digital setting manner is disclosed. The digital illumination adjusting circuit includes a microprocessor unit, a power phase detecting circuit, a time base signal generating circuit, a display, and an input pad. The microprocessor unit receives a phase synchronization signal from the power phase detecting circuit, utilizing half cycle of the alternating current power as a counting period, utilizing a time base signal generated from the time base signal generating circuit as counting pulses for the counting period. The microprocessor generates a switch control signal for controlling a conductive angle of the switch circuit which in turn controls the power output to the load.

9 Claims, 3 Drawing Sheets

DIGITAL ILLUMINATION ADJUSTING CIRCUIT

BACKGROUND OF THE INVENTION

1. Field of the Invention

The present invention relates to an illumination adjusting circuit, and more especially to a digital illumination adjusting circuit which can adjust the output to a power level of an alternating load via a digital setting manner.

2. Description of the Prior Art

Traditional illumination adjusting circuit controls the illumination level of a light or bulb by a TRIAC cooperating with a conductive angle controlling circuit and a variable resistor. However, this traditional illumination adjusting circuit can only adjust the illumination of the light while not able to perform varieties of illumination pattern setting and programming. Therefore, this traditional illumination adjusting circuit can only be applied in illumination adjusting function, neither applied for other fields nor combined with other digital circuit for more flexible use.

Moreover, the adjusting of the conductive angle of the traditional illumination adjusting circuit is achieved by adjusting a variable resistor. Since the adjusting work is done manually, the precision of the adjusting is not satisfactory and the user can only estimate by eye vision for the output power level. This may be satisfactory in a normal illumination adjusting, but it can not meet the more precise illumination adjusting or cooperate with other digital circuit to achieve other purposes.

It is requisite and valuable to design an illumination adjusting circuit which can be optionally set by the user's intention with very high precision.

SUMMARY OF THE INVENTION

Therefore, the primary purpose of the present invention is to provide a digital illumination adjusting circuit which can adjust illumination with very high precision by digital adjusting.

Another purpose of the present invention is to provide a digital illumination adjusting circuit which cooperates with a microprocessor to provide varieties of applications by digital adjusting and predetermined programs.

Further another purpose of the present invention is to provide a digital illumination adjusting circuit for setting varieties of functions such as setting the on/off timing for a light, setting the illumination level in advance, setting the on/off pattern of a light, setting the illumination levels at different time periods.

One aspect of the present invention is to provide a digital illumination adjusting circuit comprising a microprocessor unit, a power phase detecting circuit, a time base signal generating circuit, a display, and an input pad. In operation, the microprocessor unit receives a phase synchronization signal from the power phase detecting circuit, utilizing half cycle of the alternating current power as a counting period, utilizing a time base signal generated from the time base signal generating circuit as counting pulses for the counting period. The microprocessor generates a switch control signal for controlling a conductive angle of the switch circuit which in turn controls the power outputted to the load.

DETAILED DESCRIPTION OF THE PREFERRED EMBODIMENT

Figure 1:
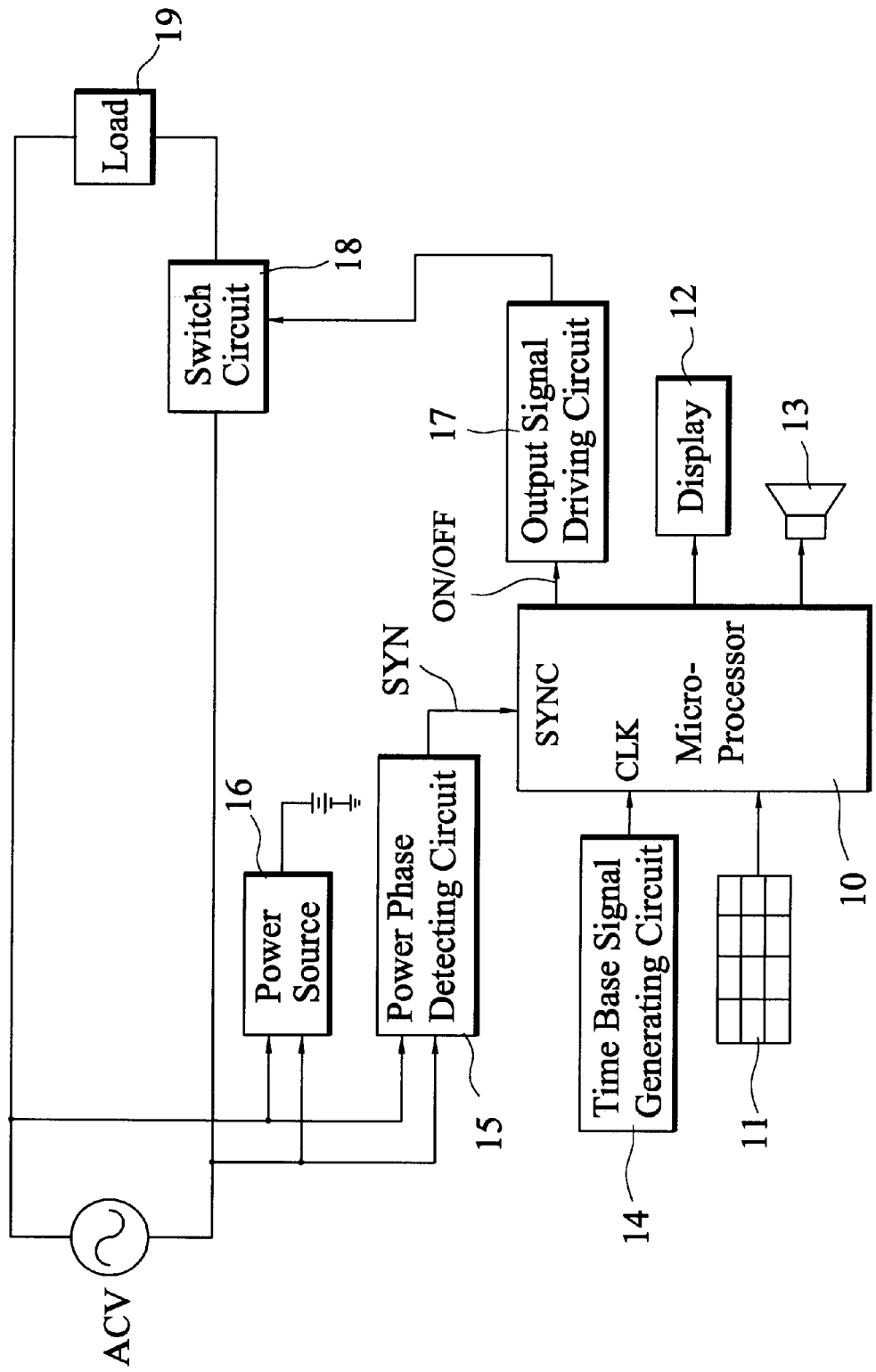
FIG. 1 is a control circuit in accordance with a preferred embodiment of the present invention.

Referring to FIG. 1, a digital illumination adjusting circuit in accordance with the present invention comprises a microprocessor unit 10 which cooperates with peripheral circuit units to control the operation of the digital illumination adjusting circuit. The microprocessor unit 10 is electrically connected to an input pad 11, a display 12, and a speaker 13 via its input and output ports. The input pad 11 comprises a plurality of keys for a user to set operation modes, input data, and set varieties of illumination patterns. The display 12 is used to illustrate digital illumination adjusting operations and the operational status of the digital illumination circuit.

A time base signal generating circuit 14 generates a time base pulse signal which is sent to a time base signal input terminal CLK of the microprocessor unit 10 for operation of the microprocessor unit 10.

A power phase detecting circuit 15 comprises an input terminal connected to an alternating power source ACV for detecting the wave phase of the alternating power source ACV, and an output terminal connected to a phase signal input terminal SYNC of the microprocessor unit 10 for transmitting a phase synchronization signal SYN to the microprocessor unit 10.

In a preferred embodiment of the present invention, the power phase detecting circuit 15 may utilize a comparator which has an inverted input terminal connected to a ground and a non-inverted input terminal connected to the alternating power source ACV for detecting the phase status of the alternating power source ACV.

The comparator may output a high level logic of a phase synchronization signal to the microprocessor unit 10 when the alternating power source ACV is operating in positive half cycle, while it outputs a low level logic of the phase synchronization signal to the microprocessor unit 10 when the alternating power source ACV is operating in a negative half cycle. The transient point of the phase synchronization signal between its high and low level logic is occurred at the zero-crossing point of the alternating power source ACV.

Another power source 16 is connected to the alternating power source ACV and generates a direct current for providing required direct current power for operation of the whole digital illumination adjusting circuit.

The microprocessor unit 10 has an output terminal connected to an output signal driving circuit 17 for controlling operation of a switch circuit 18. In this embodiment, the switch circuit 18 is a known TRIAC which has the anode and cathode connected with an electrical load 19 in series for acting as a control switch of the load 19. The load 19 herein is a light or bulb for illumination. A conductive timing of the switch circuit 18 is controlled by the output signal driving circuit 17.

Figure 2:
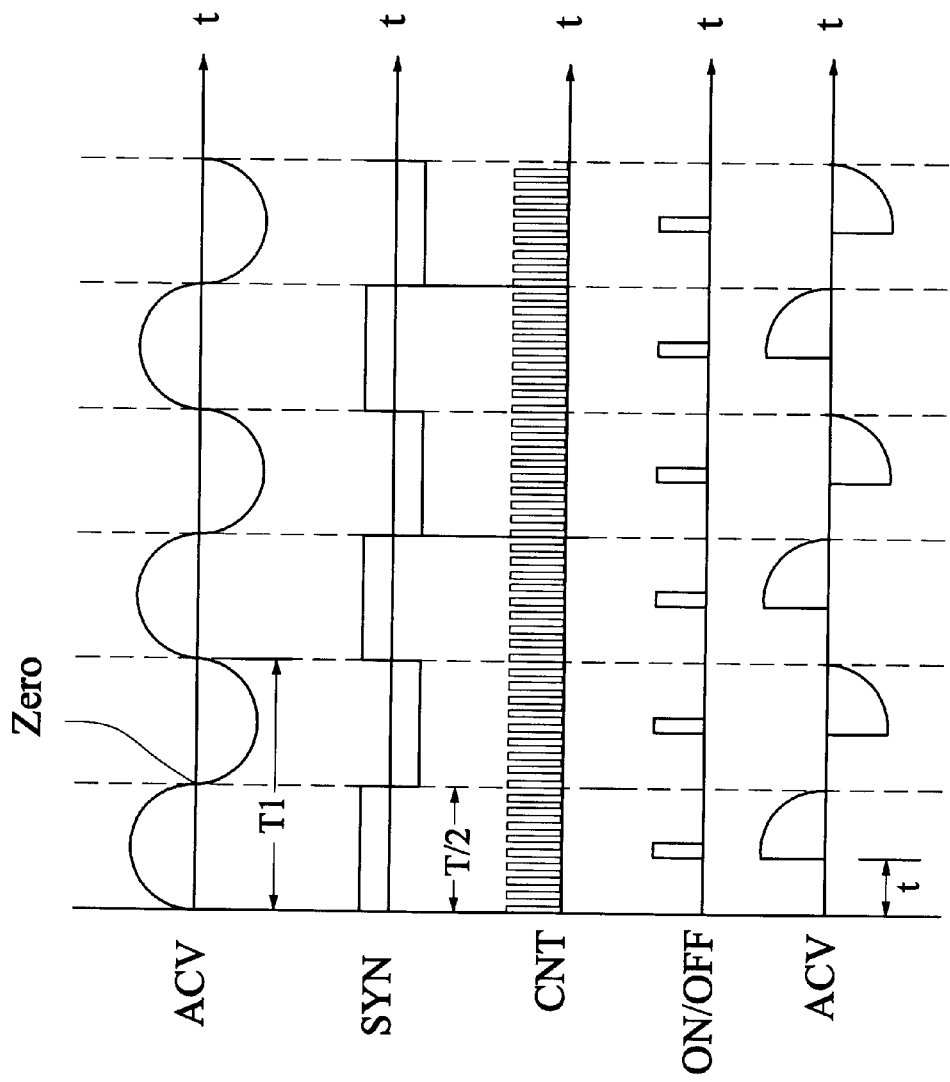
FIG. 2 is a timing relation chart of the signals used in the present invention, wherein the alternating output power has a relatively large value.

Also referring to FIG. 2, the operation theory of the present invention is explained herein. The power phase detecting circuit 15 will output the phase synchronization signal SYN whenever the alternating power source ACV is operating at the zero-crossing point Zero. Upon receiving the phase synchronization signal SYN sent from the power phase detecting circuit 15, the microprocessor unit 10 takes half cycle of the alternating power wave as a counting period, utilizes the time base signal generated by the time base signal generating circuit 14 as counting pulses for the counting period, and generates a switch control signal ON/OFF based on the output power ratio inputted by the user from the input pad 11. The switch control signal ON/OFF is amplified by the output signal driving circuit 17 and used to control the conductive angle t of the switch circuit 18 for controlling the power outputted to the load 19.

The output power ratio as discussed is between 0 to 100% and the resolution is for example 3%. the calculation of the output power ratio is based on the RMS of a sine wave as well known in this field. The pulse width of the switch control signal ON/OFF is required to trigger the TRIAC for conduction and it may be changed in a range to meet the practical requirement. For example, the value of the pulse width of the switch control signal ON/OFF may be ranged from 15 to 20 micro-seconds.

The TRIAC of the switch control circuit 18 will be conductive whenever the switch control signal ON/OFF is generated. With this manner, the output power value from the alternating power source ACV to the load 19 may be well controlled by controlling the conductive angle t of the TRIAC of the switch circuit 18.

Figure 3:
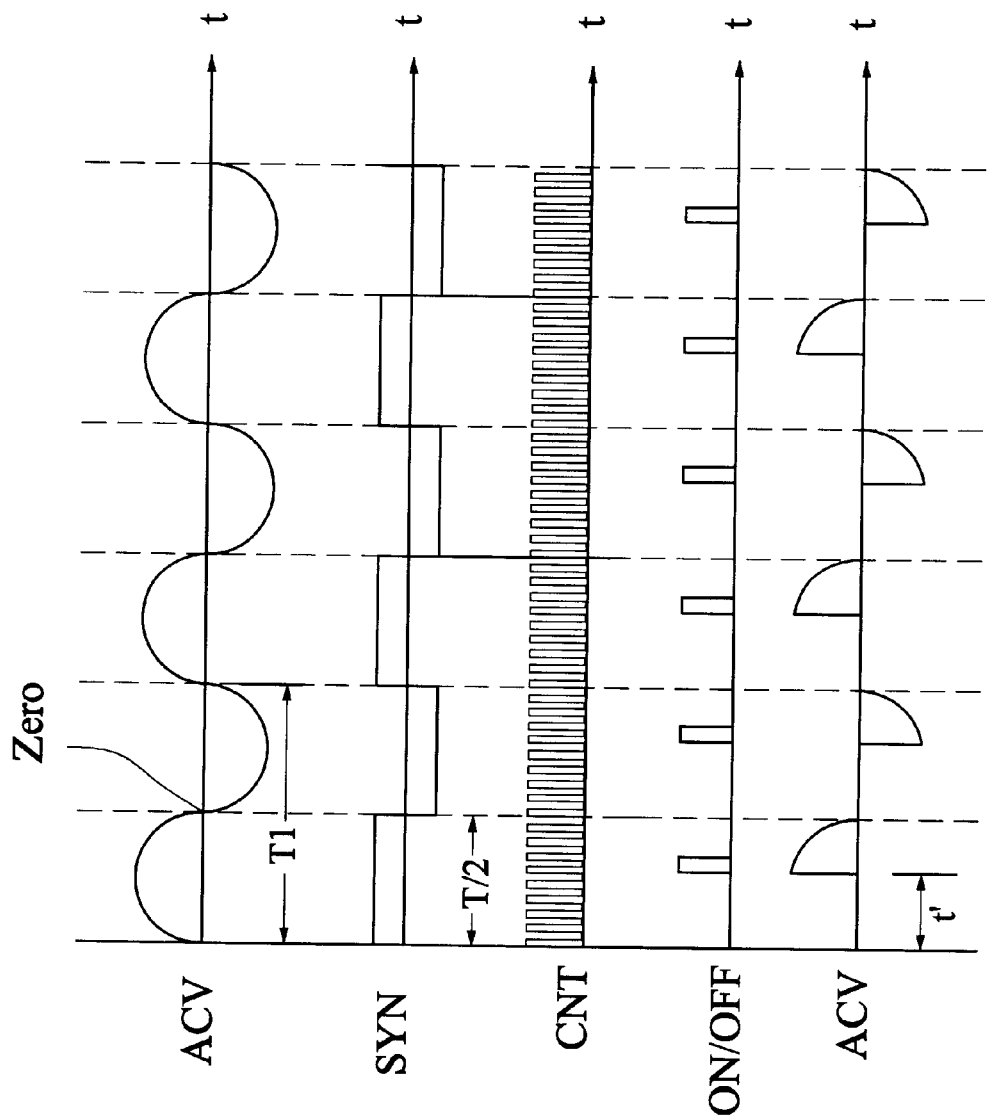
FIG. 3 is a timing relation chart of the signals used in the present invention, wherein the alternating output power has a relatively small value.

When a user wants to control the illumination of the load 19, he/she merely needs to adjust the output power ratio. For example, referring to FIG. 3, the output power from the alternating power source ACV is less than that of FIG. 2 because the conductive angle t' of FIG. 3 is greater than the conductive angle t of FIG. 2.

It can be appreciated from the above description that the present invention can achieve more precise illumination adjusting purpose than conventional technique because it utilizes the digital control manner to control the power outputted from the alternating power source to the load. Moreover, the use of the digital illumination adjusting circuit of the present invention due to the practice of the microprocessor unit will enable the user to add varieties of function setting, such as setting the on/off timing for a light, setting the illumination level in advance, setting the on/off pattern of a light, and setting the illumination levels at different time periods. For example, if a house owner goes out for vacation he/she can set the illumination level and on/off timing of a light or several lights for simulating the daily routine life by the light or lights therefore a thief will not know that actually the house owner is not home.

While the present invention has been described with reference to a specific embodiment, the description is illustrative of the invention and is not to be construed as limiting the invention. Therefore, various modifications to the present invention can be made to the preferred embodiment by those skilled in the art without departing from the true spirit and scope of the invention as defined by the appended claims.

What is claimed is:

1. A digital illumination adjusting circuit comprising:
    a microprocessor unit for controlling operation of the digital illumination adjusting circuit;
    a power phase detecting circuit connected to an alternating power source for detecting the phase of the alternating power source and outputting a phase synchronization signal to a phase synchronization input terminal of the microprocessor unit;
    a time base signal generating circuit for generating a time base pulse signal provided to the microprocessor unit as a time base signal of the microprocessor unit;
    a display for illustrating digital illumination adjusting operations and operation setting status of the digital illumination circuit;
    an input pad comprising a plurality of keys for a user to set operation modes and input data;
    wherein the microprocessor unit receives the phase synchronization signal from the power phase detecting circuit, utilizes half cycle of the alternating current power as a counting period, utilizes the time base signal generated from the time base signal generating circuit as counting pulses for the counting period, and generates a switch control signal based on an output power ratio set by the user for controlling a conductive angle of the switch circuit, which in turn controls the power outputted from the alternating power source to the load.

2. The digital illumination adjusting circuit as claimed in claim 1, wherein the power phase detecting circuit is a comparator having input terminals connected to the alternating power source for detecting the phase of the alternating power source.

3. The digital illumination adjusting circuit as claimed in claim 1, wherein the power phase detecting circuit outputs a low level logic phase synchronization signal to the microprocessor unit when the alternating power source is operating in a negative half cycle and the transient point of the phase synchronization signal between its high and low level logic is occurred at the zero-crossing point of the alternating power source.

4. The digital illumination adjusting circuit as claimed in claim 1 further comprising an output signal driving circuit for amplifying the switch control signal outputted from the microprocessor unit in order to control the operation of the switch circuit.

5. The digital illumination adjusting circuit as claimed in claim 1, wherein the output power ratio is ranged from 0 to 100%.

6. The digital illumination adjusting circuit as claimed in claim 1, wherein the output power ratio is calculated based on an RMS value of a sine wave.

7. The digital illumination adjusting circuit as claimed in claim 1, wherein the switch circuit is a TRIAC.

8. The digital illumination adjusting circuit as claimed in claim 1 further comprising a speaker for generating sound effect.

9. The digital illumination adjusting circuit as claimed in claim 1, wherein the switch control signal has a width for triggering the switch circuit to conduct.

* * * * *